3,842,168
METHOD OF PREPARING STABLE DENTIFRICE

Daniel Colodney, Green Brook, N.J., assignor to Colgate-Palmolive Company, New York, N.Y.
No Drawing. Continuation of abandoned application Ser. No. 126,922, Mar. 22, 1971. This application Jan. 15, 1973, Ser. No. 323,668
Int. Cl. A61k 7/16
U.S. Cl. 424—52                                   9 Claims

ABSTRACT OF THE DISCLOSURE

Method of stabilizing dentifrice containing alkali metal carboxyalkyl cellulose and 1,6-di-(p-chlorophenyl biguanidohexane) salt against precipitation and floculation comprising adding to alkali metal carboxyalkyl cellulose and a humectant, 1,6-di-(p-chlorophenyl biguanidohexane) in the form of a non-toxic water soluble salt thereof. Water is added together with or subsequent to the addition of the 1,6-di-(p-chlorophenyl biguanidohexane) salt. Surface-active agent, such as Sodium N-lauroyl sarcosinate is added to form a gel. The remaining dentifrice components including polishing agent are then added to the gel.

---

This is a continuation of application Ser. No. 126,922, filed Mar. 22, 1971, and now abandoned.

This invention relates to a method of stabilizing a dentifrice against precipitation and floculation. More particularly, it relates to stabilization of a dentifrice composition which promotes oral hygiene.

In accordance with the method of the instant invention, a dentifrice containing a water-soluble non-toxic acid addition salt of the highly desirable antibacterial agent, 1,6-di-(p-chlorophenyl biguanidohexane), is provided. This antibacterial agent is known to possess highly desirable effect in inhibiting the growth of many microorganisms such as *Lactobacillus acidophilus odontolyticus* and has, therefore, been recommended for incorporation into dentifrices.

However, the cosmetic stability of a dentifrice containing this antibacterial agent and an alkali metal carboxyalkyl cellulose is not satisfactory in view of incompatibility of these materials which leads to precipitation and floculation in the dentifrice composition.

It is an advantage of the instant invention that a method of preparing the stable dentifrice including a salt of 1,6-di-(p-chlorophenyl biguanidohexane) and alkali metal carboxyalkyl cellulose is provided. Other advantages of the invention will be apparent from consideration of the following specification.

In accordance with certain of its aspects, this invention relates to a method of preparing a stable dentifrice comprising adding a water-soluble non-toxic acid addition salt of 1,6-di-(p-chlorophenyl biguanidohexane) and water to an alkali metal carboxyalkyl cellulose and a humectant, then adding a surface-active agent to form a gel and then adding to said gel a dentally acceptable water-insoluble polishing material.

Any non-toxic water-soluble salt of 1,6-di-(p-chlorophenyl biguanidohexane) antibacterial agent may be employed in the practice of the instant invention. The preferred acid addition salts are the gluconate, acetate, fluoride, dihydrogen fluoride and the like. The antibacterial agent is employed in amount such that the gel contains about 0.015–15% by weight of the agent. Typically, the finished dentifrice contains about 0.01–5% by weight, preferably about 0.05–1% by weight of the agent. These amounts refer to the quantity of the free base form of the agent.

Dentifrices such as tooth pastes or dental creams include a gelling agent. Alkali metal carboxyalkyl celluloses, and particularly sodium carboxymethyl cellulose, are particularly desirable gelling agents in dentifrices. In accordance with the method of this invention dentifrices containing 1,6-di-(p-chlorophenyl biguanidohexane) salts and alkali metal carboxyalkyl cellulose are stabilized against precipitation and floculation.

The alkali metal carboxyalkyl cellulose is a hydrophilic colloid which is soluble or dispersible in water and is generally classified as water soluble. It is preferred to use the alkali metal salt of a carboxyalkyl cellulose having up to three carbon atoms in the alkyl group, such as the sodium and potassium salt of carboxymethyl cellulose. Sodium carboxymethyl cellulose and the like are available usually in the form of powders in various grades of purity and viscosity in solution. Commercial grades of sodium carboxymethyl cellulose having a purity from about 40 to 100% on a dry basis and which are of low, medium or high viscosity may be important. The degree of substitution of the carboxymethyl group per anhydroglucose unit in the cellulose molecule is variable, but may be in the range from about 0.5 to 2. Another water soluble carboxyalkyl cellulose salt which may be important is sodium carboxyethyl cellulose. The carboxyalkyl cellulose agent is present in the gel in amounts ranging from about 0.3%–30% by weight of the gel preferably 0.3%–15%. Typically, it is present in the finished dentifrice in amount of about 0.2–10% and preferably about 0.2–5% by weight.

At the time the water-soluble, non-toxic salt of 1,6-di-(p-chlorophenyl biguanidohexane) is added to the alkali metal carboxyalkyl cellulose gelling agent, the gelling agent has been mixed with a humectant, such as glycerine, sorbitol, propylene glycol and polyethylene glycol 400, including suitable mixtures thereof. Preferably the humectant is glycerine or a mixture of glycerine and sorbitol. The humectant content is typically about 30%–99% by weight of the gel preferably about 20%–75% by weight of the finished dentifrice. The dentifrice typically contains about 15–35% by weight of glycerine.

Besides the water-soluble, non-toxic acid addition salt of 1,6-di(p-chlorophenyl biguanidohexane), water is also added to the alkali metal carboxyalkyl cellulose and the humectant. Water may be added simultaneously with the salt of the antibacterial agent, or afterward. Whether it is preferred to dissolve the antibacterial agent salt in the water and add the solution to the gelling agent and the humectant, or to add the water after the antibacterial agent salt is mixed with the gelling and the humectant depends primarily on the form on which this salt is available; that is in solution or as solid. Thus, the gluconate is commercially available as a solution and when it is employed, water is added subsequently to the mixing of the antibacterial agent digluconate with the mixing of the gelling agent and the humectant. When the acetate or fluoride salt or the like, each of which is commercially available as a solid, is employed, the salt is first dissolved in water and slowly added to the alkali metal carboxyalkyl cellulose and the humectant in solution. Water is typically employed in amount of about 22.5%–69.6% by weight, in the gel and about 15%–60% by weight of the finished dentifrice.

In the method of the instant invention the gel is formed by adding synthetic organic surface active agent to the antibacterial agent, water, gelling agent and humectant. Preferably the surface active agent acts in cooperation with the antibacterial agent to improve oral hygiene, assist in achieving thorough and complete dispersion of the component of the dentifrice throughout the oral cavity, and render the dentifrice more cosmetically acceptable. When an anionic surface-active material is desired substantially saturated higher aliphatic acyl amides of lower aliphatic amino, carboxylic acid compounds such as those having 12 to 16 carbons in the fatty acid, alkyl or acyl radicals are particularly preferred. Examples of the last mentioned amides are N-lauroyl sarcosine, and the sodium, potassium and ethanolamine salts of N-lauroyl, N-myristoyl or N-palmitoyl sarcosine which should be substantially free from soap or similar higher fatty acid material which tends to substantially reduce the effect of these compounds. The use of these sarcosinate compounds in dentifrice compositions of the present invention is particularly advantageous since these materials exhibit a prolonged and marked effect in the inhibition of acid formation in the oral cavity due to carbohydrates breakdown in addition to exerting some reduction in the solubility of tooth enamel in acid solutions.

Other particularly suitable surface-active materials include nonionic agents such as condensates of sorbitan monostearate with approximately 60 moles of ethylene oxide, condensates of ethylene oxide with propylene oxide condensates of propylene glycol (available under the trademark ("Pluronics")) and amphoteric agents such as quaternized imidazole derivatives which are available under the trademark "Miranol" such as Miranol $C_2M$. Cationic surface-active germicides and antibacterial compounds such as di-isobutylphenoxyethyl dimethyl benzyl ammonium chloride, benzyl dimethyl stearyl ammonium chloride, tertiary amines, having one fatty alkyl group (of from 12 to 18 carbon atoms) and two (poly) oxyethylene groups attached to the nitrogen (typically containing a total of from about 2 to 50 ethanoxy groups per molecule) and salts thereof with acid and compounds of the structure

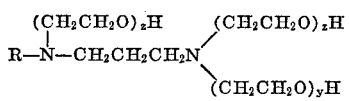

where R is a fatty alkyl group containing from about 12 to 18 carbon atoms, and $x$, $y$, and $z$ total 3 or higher, as well as salts thereof with mineral or organic acids, may also be used. It is preferred to use from about 0.075 to 15% by weight of the foregoing surface-active materials in the gel and about 0.05–5% by weight in the dentifrice.

Any suitable substantially water-insoluble dentally acceptable polishing agent may be blended into the gel formed in the manner set forth above, thereby forming a dentifrice composition such as a toothpaste or cream, gel and the like. There is a relatively large number of such agents known in the art. Representative agents include, for example, dicalcium phosphate, tricalcium phosphate, insoluble sodium metaphosphate, aluminum hydroxide, crystalline silica, magnesium carbonate, calcium carbonate, calcium pyrophosphate, bentonites, etc., including suitable mixtures thereof. It is often desired to use an aluminum hydroxide, such as the hydrated alumina sold by Alcoa as C333, and crystalline silica polishing agents.

The polishing agent content is variable, but will generally be up to about 75% by weight of the total composition, typically about 20–75%.

In the dentifrice, liquids and solids are apportioned to form a creamy mass of desired consistency which is extrudable from an aerosol container or a collapsible, e.g., aluminum or lead, tube.

Various other materials may be incorporated in the dentifrices of this invention. Examples thereof are coloring or whitening agents, silicones, chlorophyl compounds, ammoniated materials such as urea, and other constituents. These adjuvants are incorporated in the instant compositions in amounts which do not substantially adversely affect the properties and characteristics desired and are selected and used in proper amount depending upon the particular type of preparation involved. For example, ammoniated materials such as urea, and mixtures thereof, when present, are typically employed in amount of about 1 to 2% by weight.

In addition to 1,6-di-(p-chlorophenyl biguanidohexane), dentifrices in accordance with this invention may include additional cationic antibacterial agents such as $N^1$-(4-chlorobenzyl)-$N^5$-(2,4-dichlorobenzyl) biguanide; p-chlorophenyl biguanide;
4-chlorobenzhydryl biguanide;
4-chlorobenzhydrylguanylurea;
N-3-lauroxpropyl-$N^5$-p-chlorobenzylbiguanide;
1 - (lauryldimethylammonium - 8 - (p - chlorobenzyldimethylammonium)) octane dichloride;
5,6-dichloro-2 guanidinobenzimidazole;
$N^1$-p-chlorophenyl-$N^5$-laurylbiguanide;
5 - amino - 1,3 - bis (2-ethylhexyl)-5-methylhexahydropyrimidine;

and their non-toxic acid addition salts such as the gluconate and acetate. The total amount of such agents including 1,6-di(p-chlorophenyl biguanidohexane) is typically about 0.05%–5% by weight.

The dentifrice vehicle of the instant invention contains a flavoring oil and may also contain a sweetening agent. Examples of suitable flavoring oil include oils of spearmint, peppermint, wintergreen, sassafras, clove, sage, eucalyptus, marjoram, cinnamon, lemon and orange, as well as sodium methylsalicylate. Suitable sweetening agents include sucrose, lactose, maltose, sorbitol, sodium cyclamate, perillartine and saccharine. Suitably, flavor alone or together with sweetening agent may together comprise from about 0.01 to 5% or more of the dentifrices of the instant invention. Sweetening agent may be adde prior to gel formation, as together with humectant, or after gel formation.

The compositions of the present invention suitably may also contain a fluorine-containing compound having a beneficial effect on the care and hygiene of the oral cavity, e.g., diminution of enamel solubility in acid and protection of the teeth against decay. Examples thereof include sodium fluoride, potassium fluoride, potassium stannous fluoride ($SnF_2 \cdot KF$), sodium hexafluorostannate, stannous chlorofluoride, sodium fluorozirconate, and sodium monofluorophosphate. These materials, which dissociate or release fluorine-containing ions in water, suitably may be present in an effective but non-toxic amount, usually within the range of about 0.01 to 1% by weight of the water soluble fluorine content thereof.

The dentifrices should have a pH practicable for use. The pH range of about 5 to 9, preferably about 6–8, is considered the most practicable for use. Where reference is made to pH herein, it is intended that such pH determination be made on the gel directly.

The dentifrice of the invention may be further stabilized against separation into liquid and solid phases due to the presence of phosphate ion and flavoring oil by including a stabilizing agent such as a water soluble alkaline earth metal salt of a strong acid, e.g. calcium chloride as described in Ser. No. 127,972 of Daniel Colodney and James Norfleet filed on even date herewith, or ethyl alcohol, as described in Ser. No. 129,971 of Joseph Paul Januszewski and Tayseer George Bahouth, also filed on even date herewith.

The following specific examples are further illustrative of the nature of the present invention, but it is understood that the invention is not limited thereto. The compositions are prepared in the usual manner and all amounts and proportions are by weight unless otherwise specified.

EXAMPLE 1

22.0 parts of glycerine and 0.20 parts of sodium saccharin are blended with 0.85 parts of sodium carboxymethyl cellulose. 1,6-di-(p-chlorophenyl biguanidohexane) diacetate in amount providing 0.5 parts of the free base form of the salt is dissolved in 16.65 parts of water and then slowly added with stirring to the blend of glycerine, sodium saccharine and sodium carboxymethyl cellulose. A gel is then formed by adding to the above-mentioned materials 2.00 parts of sodium N-lauroyl sarcosinate (35% water).

A dentifrice is then formed as 47.00 parts of dicalcium orthophosphate dihydrate, 5.00 parts of calcium carbonate, 5.0 parts of calcium chloride and 0.80 parts of oil of peppermint flavor are blended into the gel.

The dentrifrice thus formed remains cosmetically stable over an extended period of time.

When the procedure set forth above is modified so that 1,6-di-(p-chlorophenyl biguanidohexane) salt added to glycerine and sodium carboxymethyl cellulose in which water has been incorporated in the conventional mode of preparation, the salt reacts with the carboxymethyl cellulose resulting in precipitation and flocculation in the dentifrice.

EXAMPLE 2

The procedure of Example 1 is repeated except that 4.725 parts of a 20% solution of 1,6-di-(p-chlorophenyl biguanidohexane) digluconate is added to the glycerine, sodium saccharine and sodium carboxymethyl cellulose and water is thereafter added in total amount to 16.65 parts.

The completed dentifrice remains cosmetically stable over an extended period of time.

It will be apparent to one skilled in the art that various modifications may be made and equivalents substituted therefor.

What is claimed is:

1. A method of preparing a stable dentifrice comprising adding a water-soluble non-toxic acid addition salt of 1,6-di-(p-chlorophenyl biguanido)hexane in amounts of about 0.01–5% by weight of the free base thereof and water to a non-aqueous blend of about 0.2–10% by weight of an alkali metal carboxymethyl cellulose and a humectant, then adding a surface-active agent to form a gel and then adding to said gel a dentally acceptable water-insoluble polishing material; said percentages being based on said dentifrice composition.

2. The method claimed in Claim 1 wherein acid addition salt of 1,6-di-(p-chlorophenyl biguanido)hexane is a salt selected from the group consisting of gluconate acetate, fluoride and dihydrogen fluoride salts.

3. The method claimed in Claim 2 wherein said salt is 1,6-di-(p-chlorophenyl biguanidohexane) diacetate and said salt is added to the humectant and alkali metal carboxyalkyl in solution in water.

4. The method claimed in Claim 2 wherein said salt is 1,6-di-(p-chlorophenyl biguanido)hexane digluconate and said salt is added to the humectant prior to the addition of water.

5. The method claimed in Claim 1 wherein said humectant is selected from the group consisting of glycerine, sorbitol, propylene glycol and polyethylene glycol 400 and mixtures thereof.

6. The method claimed in Claim 5 wherein said humectant is glycerine.

7. The method claimed in Claim 1 wherein said surface-active agent is sodium N-lauroyl sarcosinate.

8. The method claimed in Claim 1 wherein based on 100% by weight of the dentifrice there are employed about 20–75% by weight of said humectant, about 0.2–10% by weight of said alkali-metal carboxymethyl cellulose, about 0.01–5% by weight of said acid addition salt of 1,6-di-(p-chlorophenyl biguanido)hexane, about 15–60% by weight of water, about 0.05–5% by weight of said surface-active agent and about 20–75% by weight of said polishing material.

9. A method of preparing a stable dentifrice comprising adding a water-soluble non-toxic acid addition salt of 1,6-di-(p-chlorophenyl biguanido)hexane in amounts of about 0.01–5% of the free base thereof and water to a non-aqueous blend of about 0.2–10% by weight of an alkali metal salt of sodium carboxymethyl cellulose and a humectant comprising glycerine, then adding sodium N-lauroyl sarcosinate to form a gel and then adding to said gel a dentally acceptable water-insoluble polishing material; said percentages being based on said dentifrice composition.

References Cited

FOREIGN PATENTS 825,577  12/1959  Great Britain _____ 424—54

RICHARD L. HUFF, Primary Examiner

U.S. CL. X.R.

424—54